United States Defensive Publication [19] (H) [11] T104,501

Jones et al. [43] Aug. 7, 1984

[54] PRODUCTION OF HIGH-ANALYSIS AMMONIUM ORTHOPHOSPHATE SUSPENSION FERTILIZERS BY A NEW BATCH-TYPE PROCESS

[76] Inventors: Thomas M. Jones, 208 Stephenson Ct., Sheffield, Ala. 35660; Lucian A. Kendrick, Jr., 1025 Dixie Ave., Florence, Ala. 35630

[21] Appl. No.: 546,261

[22] Filed: Oct. 28, 1983

[51] Int. Cl.[3] ..... C05B 7/00

[52] U.S. Cl. ..... 71/34; 71/43

[57] ABSTRACT

An improved process for the production of highly concentrated ($N$-$P_2O_5$) suspension fertilizers effected by the ammoniation of wet-process or other impure orthophosphoric acids in batch-type equipment. The underlying concept which goes to the gist of the instant invention involves the use of a heel of product from a previously prepared batch to provide nuclei and a suitable environment for the conversion of the metallic impurities therein into crystalline habits rather than the usual highly undesirable form of metallic impurity gel-like compounds, which gels cause extremely high viscosities, nonpourability, and complete destruction of fluidity in concentrated ammonium phosphate suspension fertilizers prepared by prior-art procedures. Also, during the ammoniation of acids by the instant process, the heel maintained therein prevents severe thickening due to mass crystallization of monoammonium phosphate, which severe thickening normally results in either/or extremely slow further ammoniation and excessive ammonia losses. Practice of this method is simple, economical, versatile, and can be performed in readily available equipment.

11 Claims, 1 Sheet Drawing,

29 Pages Specification

The file of this unexamined application may be inspected and copies thereof may be purchased (849 O.G. 1221, Apr. 9, 1968).

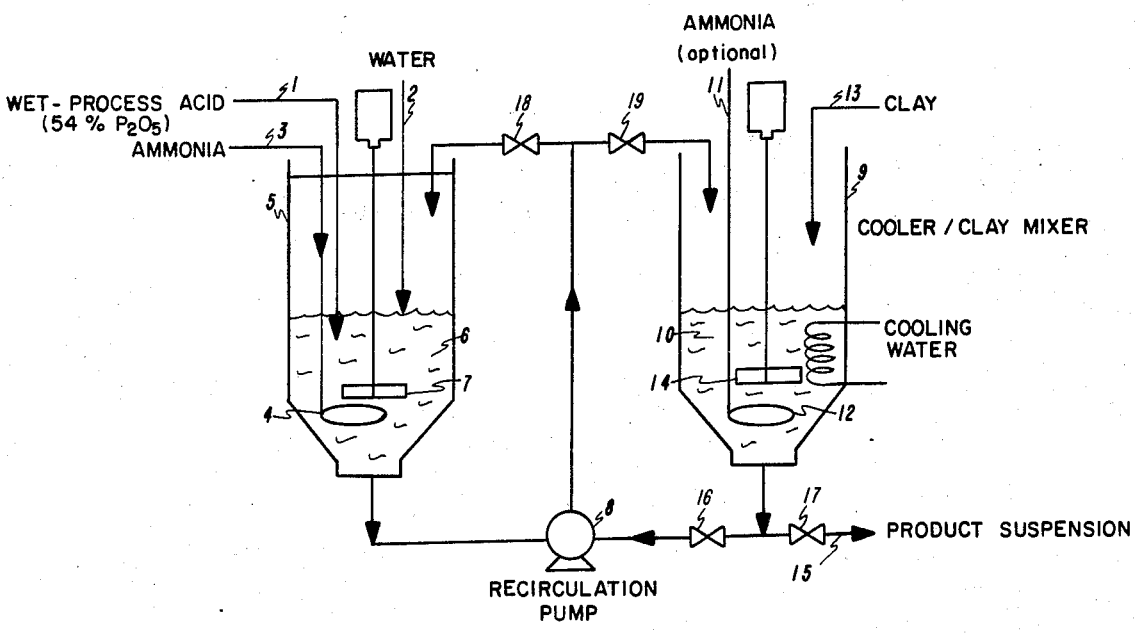

BATCH PRODUCTION OF AMMONIUM ORTHOPHOSPHATE BASE SUSPENSION FERTILIZERS

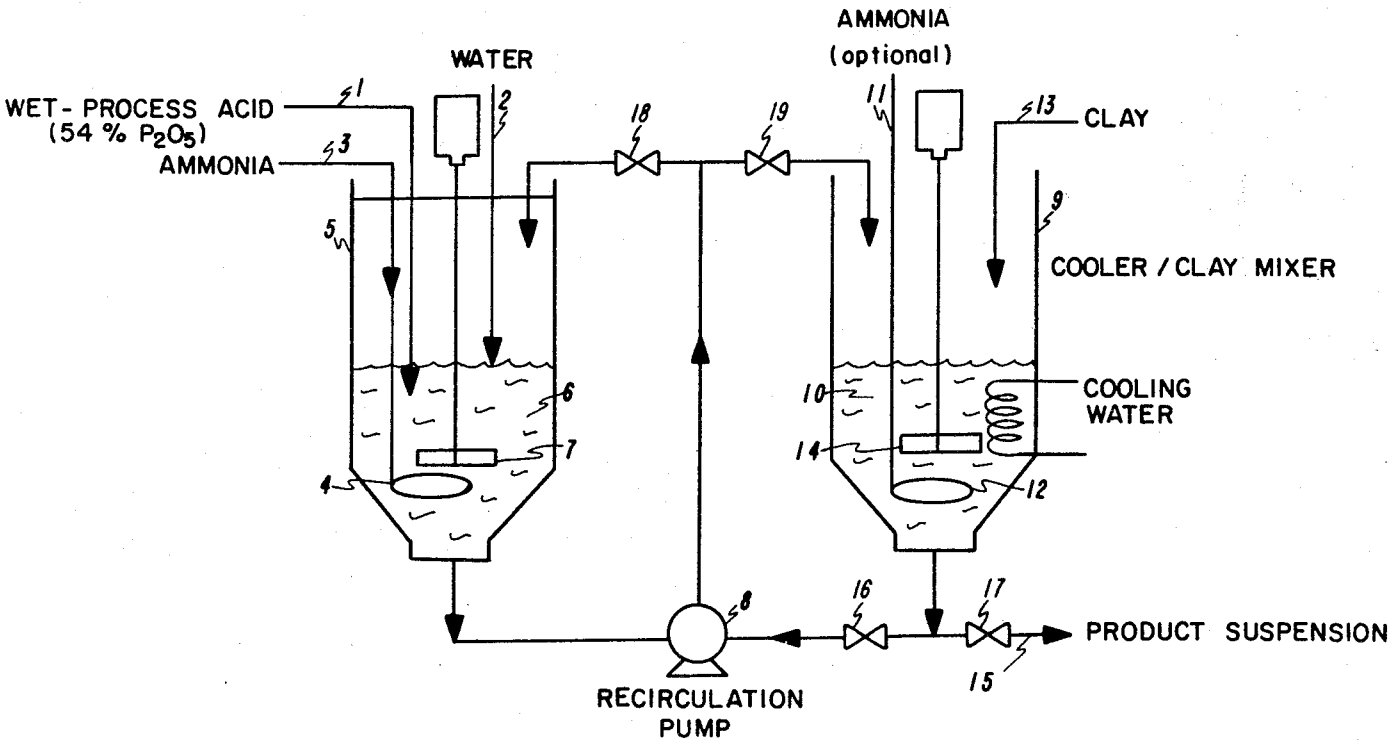
BATCH PRODUCTION OF AMMONIUM ORTHOPHOSPHATE
BASE SUSPENSION FERTILIZERS